United States Patent [19]

Brajder et al.

[11] Patent Number: 4,523,268
[45] Date of Patent: Jun. 11, 1985

[54] METHOD AND CIRCUIT FOR GENERATING DRIVE PULSES FOR A DC CONTROL ELEMENT

[75] Inventors: Antonio Brajder; Klaus Hantke, both of Erlangen, Fed. Rep. of Germany

[73] Assignee: Siemens Aktiengesellschaft, Munich, Fed. Rep. of Germany

[21] Appl. No.: 509,806

[22] Filed: Jun. 30, 1983

[30] Foreign Application Priority Data

Jul. 12, 1982 [DE] Fed. Rep. of Germany ....... 3226001

[51] Int. Cl.³ .............................................. H02P 13/18
[52] U.S. Cl. ....................................... 363/98; 363/41; 363/132
[58] Field of Search ................... 363/41, 98, 132, 133, 363/134

[56] References Cited

U.S. PATENT DOCUMENTS

| | | | |
|---|---|---|---|
| 3,440,566 | 4/1969 | Swanson ............................... | 363/41 |
| 4,204,266 | 5/1980 | Kammiller et al. ................... | 363/98 |
| 4,314,325 | 2/1982 | Siebert ................................. | 363/41 |
| 4,424,557 | 1/1984 | Steigerwald .......................... | 363/98 |

OTHER PUBLICATIONS

"Netzgeführte Stromrichter mit Thyristoren", by G. Möltgen, 2nd Ed., pp. 278–279.

*Primary Examiner*—Peter S. Wong
*Assistant Examiner*—D. L. Rebsch
*Attorney, Agent, or Firm*—Kenyon & Kenyon

[57] ABSTRACT

Method and circuitry for generating drive pulses for a DC control element of the type having four semiconductor switches arranged in a bridge circuit. Two triangular voltage waveforms are formed and are shifted with respect to one another by a difference voltage. Each bridge branch of the bridge circuit is driven in response to a comparison between the first triangular voltage waveform and a control voltage, and a second semiconductor switch of each bridge branch is driven in response to a comparison of the second triangular voltage waveform and the same control voltage. A pause between the conductive periods of the semiconductor switches within a bridge branch is obtained by driving the semiconductor switches with offset triangular voltage waveforms. The pauses prevent short circuits of a supply voltage source, and their duration is determined by the difference voltage and can therefore be achieved accurately at low cost.

7 Claims, 4 Drawing Figures

METHOD AND CIRCUIT FOR GENERATING DRIVE PULSES FOR A DC CONTROL ELEMENT

BACKGROUND OF THE INVENTION

This invention relates generally to a method and circuitry for generating drive pulses for a DC control element of the type having four semiconductor switches arranged in a bridge circuit, and more particularly, to a method and circuit wherein trigger pulses for the semiconductor switches are produced by comparing a triangular waveform with a control voltage; there being a pause between the "on" states of the semiconductor switches.

In known DC control elements, a resultant load current or load voltage is determined by the duty cycle of two semiconductor switches which are arranged diagonally opposite from one another in a bridge circuit. Load current and voltage is produced at the load in response to drive pulses which determine the conductive state of the semiconductor switches; the pulses having selectable duration. In accordance with the reference text, *Netzgefuhrte Stromrichter mit Thyristoren (Line-Controlled Converters With Thyristors)*, by Gottfried Möltgen, 2nd. Ed., pages 278-9, such pulses are achieved by the comparison of a triangular, sawtooth voltage with a control voltage. The switching-on and switching-off states of the semiconductor switches are determined in response to the coincidence of the magnitude of the triangular sawtooth voltage waveform with a control voltage. In the known bridge circuit, it is important that the semiconductor switches which are connected in series in the bridge circuit not be simultaneously in conductive states, because such would be a short circuiting of the supply voltage source.

In the following discussion, the series circuit having two semiconductor switches connected across the power supply will be termed a "bridge branch." Two semiconductor switches connected to the same pole of the supply voltage are designated a "bridge half."

Short circuiting of the power supply is prevented by providing a pause between the "on" states of the semiconductor switches of the bridge. In known, commercially available equipment, each bridge branch is provided with first and second semiconductor switches which are operated inversely with respect to one another, and RC timing members are provided for producing the pause between the "on" states. Such an arrangement requires a large number of circuit components, and the duration of the pause is dependent upon the tolerance of the individual components in the delay circuit.

As a result of the pauses, which are required and are provided when switching from one bridge diagonal to the other, a dead zone is produced in the transfer characteristic such that small positive or negative control voltages cause no output voltage. The tolerance of the pause time, which is caused by the capacity of the capacitor in the RC circuit, produces the disadvantage that the dead zone is different for negative and positive values of control voltage. Thus, the transfer characteristic which correlates the control voltage and the output voltage of the DC control element is asymmetrical. As a result of this, the dead zone cannot be compensated uniformly for both polarities of control voltage at the zero crossing of the control voltage.

It is, therefore, an object of this invention to provide a method of generating drive pulses for a DC control element wherein the tolerance of the pauses can be maintained small. It is a further object of this invention to provide a method of generating drive pulses for a DC control element wherein pause times can be adjusted in a simple manner.

It is also an object of this invention to produce a simple circuit arrangement for generating drive pulses for a DC control element.

SUMMARY OF THE INVENTION

The foregoing and other objects are achieved by this invention which provides first and second triangular waveforms which are shifted in phase with respect to one another; the phase shift being produced by a difference voltage. A first semiconductor switch in each bridge branch is driven by comparison of the first triangular waveform voltage with a control voltage, and a second semiconductor switch of the same bridge branch is driven by comparing the second triangular waveform voltage with the control voltage. In this manner, the required duration of the pause is realized by providing two mutually shifted triangular waveform voltages for driving the two semiconductor switches of each bridge branch. The amount of phase shift can be predetermined by providing a constant difference voltage. Moreover, the tolerance of the duration of the pause is small, and the duration is easily adjusted jointly for all semiconductor switches in response to control of the magnitude of the difference voltage.

In one advantageous embodiment of the invention, the first and second triangular voltage waveforms are shifted with respect to an auxiliary triangular voltage waveform which is symmetrical with respect to a reference potential. Such shifting is produced by providing to the first and second triangular voltage waveforms difference voltages which are equal in magnitude. This arrangement renders the dead zone of the transfer characteristic to be symmetrical with respect to the reference potential. It is an advantage of the present invention that if the polarity of the control voltage is positive, a positive difference voltage is added thereto, and if the polarity of the control voltage is negative, a negative difference voltage is applied. Thus, the dead zone of the transfer characteristic is compensated such that the pauses become ineffective when switching from one bridge diagonal to the other, while preserving the pauses for the "on" states of the bridge branch.

In one embodiment, the difference voltage may be proportional to the frequency of the drive pulses. Thus, the resulting pauses each have a duration which is independent of the frequency of the drive pulses.

In accordance with a circuit aspect of the invention, a circuit arrangement is provided in which each semiconductor switch is driven by a comparator, each comparator having two inputs. The control voltage is received at the first input of each comparator, and a second input of each comparator is connected in series with a first adder; the auxiliary triangular voltage waveform $V_{DO}$ being present at a first input of each adder. The positive difference voltage is present at a second input of each adder which is assigned to a semiconductor switch of a first bridge half, and a negative difference voltage is present at a second input of each adder which is assigned to a semiconductor switch of a second bridge half. This circuit arrangement can implement the method described above.

The auxiliary triangular voltage waveform can be conducted to a frequency/voltage converter which delivers the difference voltage at its output. Thus, a difference voltage which is proportional to the frequency of the trigger pulses is provided, and a pause is produced having a duration which is independent of the frequency of the triangular voltage waveform and the drive pulses.

The control voltage can be supplied to a first input of a second adder and to a polarity detection stage, where the polarity detection stage controls a double-throw switch which supplies, to a second input of the second adder, either the positive or the negative difference voltage, depending upon the polarity of the control voltage. The second adder is connected at its output to the first input of each comparator. This circuit arrangement eliminates the dead zone for small control voltages.

BRIEF DESCRIPTION OF THE DRAWINGS

Comprehension of the invention is facilitated by reading the following detailed description in conjunction with the annexed drawings, in which.

DETAILED DESCRIPTION

Figure 1:
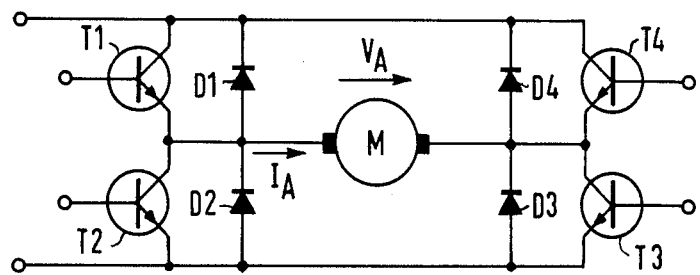
FIG. 1 is a schematic representation of the basic circuitry of a DC control element having four semiconductor switches.

FIG. 1 is a schematic illustration of a basic circuit of a DC control element having four semiconductor switches T1, T2, T3, and T4, where the semiconductor switches are transistors. The DC control element is formed of a first bridge branch having semiconductor switches T1 and T2, and a second bridge branch having semiconductor switches T3 and T4. A motor M is connected as a load in a diagonal of the bridge circuit, and is indicated in the figure as having a voltage $V_A$. Each of the semiconductor switches is provided with an associated one of bypass diodes D1, D2, D3, and D4, which conduct load current $I_A$ when the associated semiconductor switch is in a nonconductive state.

Figure 2:
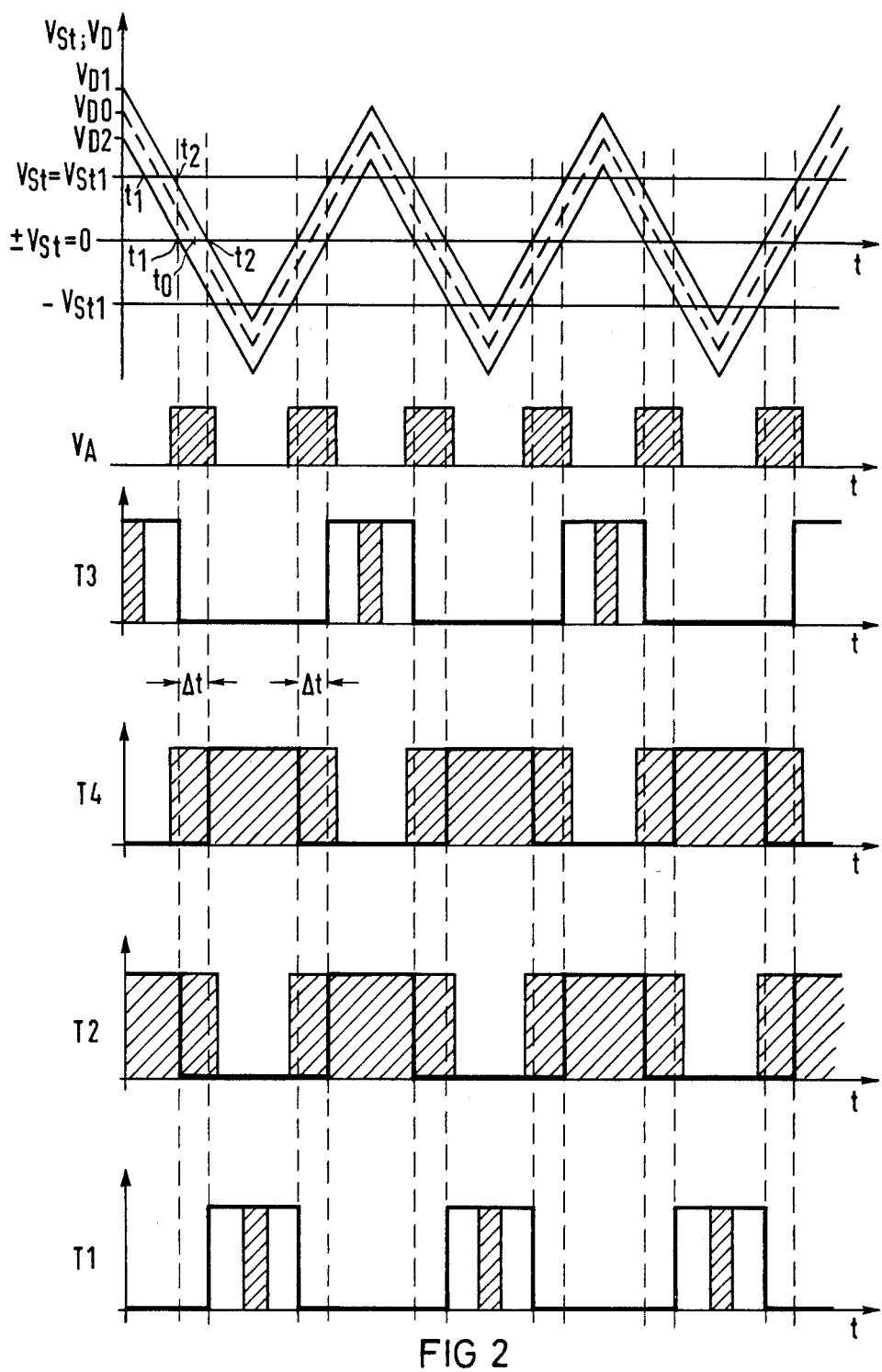
FIG. 2 is a timing diagram which is useful for explaining the method of the invention.

FIG. 2 is a timing diagram which is useful in explaining the method aspect of the invention. FIG. 2 shows an auxiliary triangular voltage waveform $V_{D0}$ which is symmetrical about a voltage $V_{St}$ which is assumed to equal zero. From this auxiliary triangular voltage waveform, two further triangular voltage waveforms $V_{D1}$ and $V_{D2}$ are formed, which are shifted by $\Delta V_1$ and $\Delta V_2$, respectively, with respect to the auxiliary triangular voltage waveform. In this embodiment, $\Delta V_2 = -\Delta V_1$. Thus, the two triangular voltage waveforms $V_{D1}$ and $V_{D2}$ are thus available and are shifted with respect to one another by a difference voltage $\Delta V = \Delta V_1 - \Delta V_2$. The drive pulses are produced by comparing triangular voltage waveforms $V_{D1}$ and $V_{D2}$ against a control voltage $V_{St}$.

In the case where $V_{St}$ equals zero, the resulting drive pulses for the semiconductor switches T1 to T4 are shown by the heavy lines in FIG. 2. The semiconductor switches of the upper bridge half, T1 and T4, are controlled by comparison of control voltage $V_{St}$ with the first triangular voltage waveform $V_{D1}$. Semiconductor switch T1 is switched into a conductive state as long as the first triangular voltage waveform $V_{D1}$ is smaller than the inverted control voltage $-V_{St}$. Semiconductor switch T4 is switched into a conductive state if the triangular voltage waveform $V_{D1}$ is smaller than control voltage $V_{St}$. The semiconductor switches of the lower bridge half, T2 and T3, are controlled by comparison of control voltage $V_{St}$ with the second triangular voltage waveform $V_{D2}$. Semiconductor switch T3 is switched into a conductive state as long as second triangular voltage waveform $V_{D2}$ is larger than control voltage $V_{St}$. Similarly, semiconductor switch T2 is switched into a conductive state as long as second triangular voltage waveform $V_{D2}$ is larger than the inverted control voltage $-V_{St}$.

An examination of the switching diagrams for semiconductor switches T1, T2, T3, and T4 reveals that the conductive states of the semiconductor switches of each bridge branch are shifted by one pause duration $\Delta t$. This pause duration $\Delta t$ is obtained from the difference of the times $t_1$ and $t_2$, in which triangular voltage waveforms $V_{D1}$ and $V_{D2}$ agree with control voltage $V_{St}$. The magnitude of this difference, which corresponds to the pause duration $\Delta t$, consequently depends upon the difference of triangular voltage waveforms $V_{D1}$ and $V_{D2}$. Thus, $\Delta V = \Delta V_1 - \Delta V_2$.

The timing diagram of FIG. 2 illustrates that at no time are any of the semiconductor switches which are diagonally opposite to each other in the bridge circuit simultaneously conductive. Thus, output voltage $V_A$ of the bridge circuit is zero, as desired for control voltage $V_{St} = 0$. It is also evident from the timing diagrams of FIG. 2 that, for a small positive or negative control voltage, $V_{St}$, no overlap of the conductive times of diagonally opposite semiconductors T1, T3 and T2, T4, takes place yet because the pause $\Delta t$ has an effect when switching between two diagonally opposite semiconductor switches T1, T3 and T2, T4, respectively. In a dead zone about control voltage $V_{St} = 0$, no output voltage $V_A$ is therefore produced. Only if the control voltage becomes larger than the positive difference voltage $V_{D1}$, or smaller than the negative difference voltage $V_{D2}$, is an overlap of the conductive times of diagonally opposite semiconductors T1, T3 and T2, T4 achieved. Thus, output voltage $V_A$ rises with further increasing control voltage. The dead zone, in which a control voltage does not yet cause an output voltage, is therefore between the positive difference voltage $\Delta V_1$ and the negative difference voltage $\Delta V_2$;

$$\Delta V_1 < V_{ST} < \Delta V_2$$

since $\Delta V_2 = -\Delta V_1$, the dead zone is symmetrical with respect to control voltage $V_{St} = 0$.

FIG. 2 is a timing diagram illustrating the drive signals for the semiconductor switches, for the case of a positive control voltage $V_{St} = V_{St1}$. The drive pulses for semiconductor switches T1, T2, T3, and T4, as well as output voltage $V_A$, are shown shaded. In this situation, an overlap of the "on" times of the diagonally opposite semiconductor switches T2 and T4 occurs, such that the depicted waveform of output voltage $V_A$ is produced. Between the "on" times of semiconductor switches T1 and T2 in the second bridge diagonal, no overlap occurs. The pauses between the "on" states of semiconductor switches T1, T2 and T3, T4 of a bridge branch remain constant because the times $t_1$ and $t_2$ corresponding to the intersections of the triangular voltage waveforms $V_{D1}$ and $V_{D2}$ with control voltage $V_{St}$ does not change.

Figure 3:
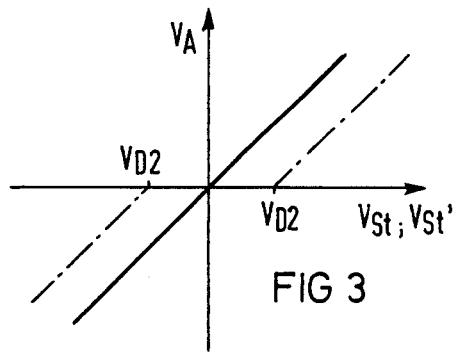
FIG. 3 is a graph showing the relationship between the control and output voltages of the DC control element which is useful in explaining the dead zone.

FIG. 3 illustrates the relationship between control voltage $V_{St}$ and output voltage $V_A$ of the DC control element; the uncompensated case being shown by dash-dotted line. This figure is useful in illustrating a compensation process which will be described below for removing the dead zone in the transfer characteristic.

As shown in FIG. 3, output voltage $V_A$ remains zero as long as control voltage $V_{St}$ is in the range between positive difference voltage $V_{D1}$ and negative difference voltage $V_{D2}$. The output voltage increases or decreases linearly with control voltage $V_{St}$ outside of this range. However, a transfer characteristic without this dead zone can be achieved if the positive difference voltage $V_{D1}$ is added to an uncorrected control voltage $V'_{St}$ as long as the uncorrected control voltage has positive values. The negative difference voltage $V_{D2}$ is added as long as the uncorrected control voltage $V'_{St}$ has negative values. Thus, the portion of the characteristic for positive control voltage values is shifted to the left by an amount $V_{D1}$, and the portion of the characteristic for negative control values is shifted to the right by an amount $V_{D2}$, such that the dead zone, free transfer characteristic shown in FIG. 3 is achieved.

Figure 4:
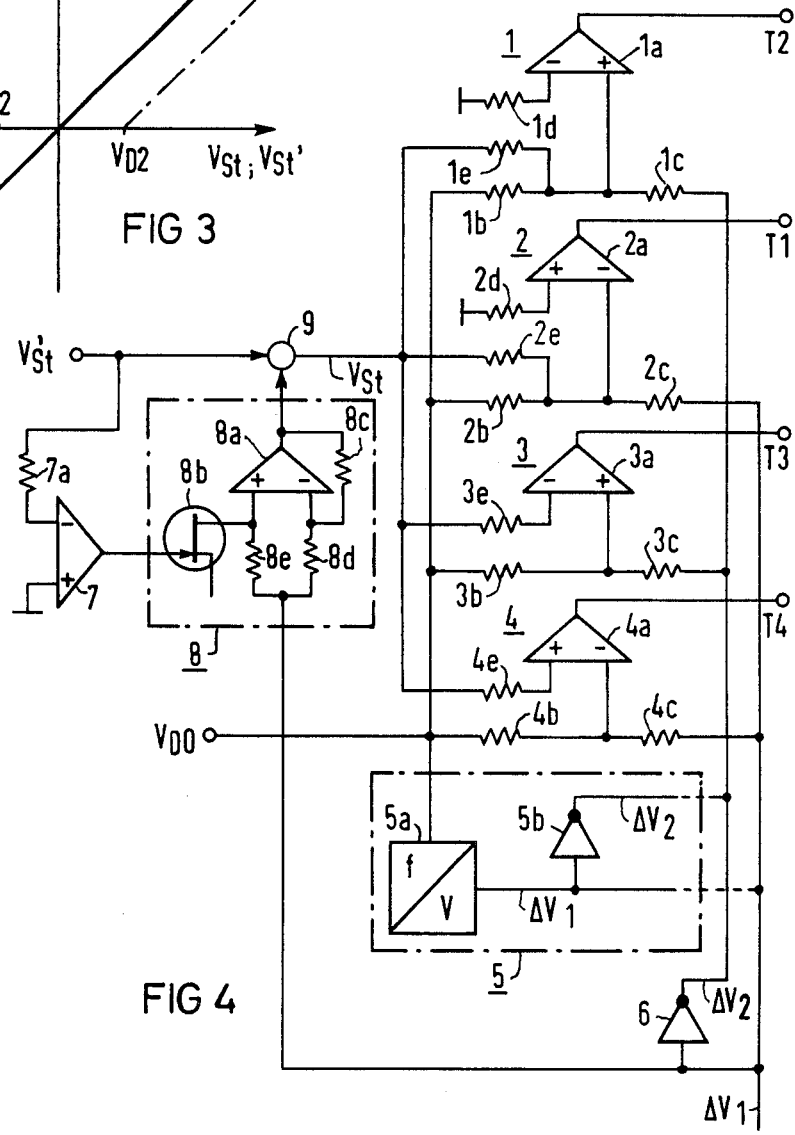
FIG. 4 is a schematic representation of a circuit constructed in accordance with the invention for practicing the method of the invention.

FIG. 4 is a schematic illustration of a circuit arrangement constructed in accordance with the invention for implementing the foregoing method. A plurality of operational amplifiers 1a, 2a, 3a, and 4a are provided for respective semiconductor switches T1, T2, T3, and T4. The operational amplifiers operate as comparators. Operational amplifier 2a is associated with semiconductor switch T1, operational amplifier 1a is associated with semiconductor switch T2, operational amplifier 3a is associated with semiconductor switch T3, and operational amplifier 4a is associated with semiconductor switch T4. The addition of the difference voltages $\Delta V_1$, $\Delta V_2$ to the auxiliary triangular voltage waveform $V_{D0}$, as well as the comparison with control voltage $V_{St}$ is achieved via resistor switch connected in series with the inputs of the operational amplifiers. Difference voltage $\Delta V_2$ is connected via a resistor 1c and auxiliary triangular voltage waveform $V_{D0}$ is connected via a resistor 1b to a noninverting input of operational amplifier 1a, such that triangular voltage waveform $V_{D1} = V_{D0} + \Delta V_2$ is produced. Control voltage $V_{St}$ is conducted via a further resistor 1e to a noninverting input of operational amplifier 1a, and the inverting input of operational amplifier 1a is connected via a resistor 1d to a reference potential. Thus, semiconductor switch T2, which is driven by operational amplifier 1a, is switched into a conductive state, as discussed above with respect to the method aspect of the invention, as long as the sum of the control voltage $V_{St}$ and triangular voltage waveform $V_{D2}$ is positive. In other words, this is achieved as long as triangular voltage waveform $V_{D2}$ is larger than inverted control voltage $-V_{St}$.

In similar manner, positive difference voltage $\Delta V_1$ is conducted to the inverting input of operational amplifier 2a via a resistor 2c, control voltage $V_{St}$ via a resistor 2e, and auxiliary triangular voltage waveform $V_{D0}$ via a resistor 2b. The noninverting input of operational amplifier 2a is connected via a resistor 2d to the reference potential of the circuit arrangement. Semiconductor switch T1 is therefore switched into a conductive state as long as the sum of $V_1$, $V_{D0}$, and $V_{St}$ is negative. Thus, this semiconductor switch is conductive as long as triangular voltage waveform $V_{D1}$ is below inverter control voltage $-V_{St}$.

The noninverting input of operational amplifier 3a is coupled to a resistor 3c to receive the negative difference voltage, and is also coupled to a resistor 3b to receive the auxiliary triangular voltage waveform $V_{D0}$. Control voltage $V_{St}$ is coupled to the inverting input of operational amplifier 3a via a resistor 3e. Semiconductor switch T3, which is driven by operational amplifier 3a, is therefore switched into a conductive state as long as the sum of $\Delta V_2$ and $V_{D0}$ is larger than the control voltage $V_{St}$. In other words, semiconductor switch T3 is conductive if triangular voltage waveform $V_{D2}$ is larger than control voltage $V_{St}$.

Difference voltage $\Delta V_1$ is provided via a resistor 4c to the inverting input of operational amplifier 4a. Auxiliary triangular voltage waveform $V_{D0}$ is provided to the inverting input via a resistor 4b. The noninverting input of operational amplifier 4a receives control voltage $V_{St}$ via a resistor 4c. Semiconductor switch T4, which is driven by operational amplifier 4a, is thereby switched into a conductive state as long as the control voltage $V_{St}$ is larger than the triangular voltage waveform formed by the sum of $V_{D0}$ and $\Delta V_1$.

The foregoing operational amplifier circuits drive semiconductor switches T1 to T4 in accordance with the inventive method. Difference voltages $\Delta V_1$ and $\Delta V_2$ can be preset as fixed values. Thus, negative difference voltage $\Delta V_2$ is advantageously formed by an inverter 6 from positive difference voltage $\Delta V_1$.

The presetting of difference voltages $\Delta V_1$ and $\Delta V_2$, as fixed values, produces the disadvantage that the pause duration $\Delta t$ depends upon the frequency of triangular waveform voltages $V_{D1}$ and $V_{D2}$. This results from the fact that since the sawtooth voltage rises faster at higher frequencies, the pause duration $\Delta t$ becomes shorter as the frequency of the triangular voltage waveform is increased.

A frequency independent pause duration for the triangular voltage waveform can be produced by forming difference voltages $\Delta V_1$ and $\Delta V_2$ by a frequency voltage converter 5a shown in FIG. 4. Auxiliary triangular voltage waveform $V_{D0}$ is then conducted to the frequency input of the frequency-voltage converter. A frequency proportional voltage is then provided at the output of frequency-voltage converter 5a which is used as positive reference voltage $\Delta V_2$ is formed from the positive difference voltage $\Delta V_1$ by an inverter 5b.

In addition to the foregoing, the circuitry of FIG. 4 is provided with a compensating device for eliminating the dead zone of the transfer characteristic. Uncorrected control voltage $V'_{St}$ is conducted to one input of an adder 9, and via a resistor 7a to an inverting input of an operational amplifier 7. The noninverting input of operational amplifier 7 is coupled to the reference potential of the circuit arrangement. This operational amplifier therefore serves as a polarity detection stage which delivers at its output a positive voltage as long as the control voltage is negative. The output of the operational amplifier is connected to the base of a switching transistor 8b of a double-throw switching device 8. Switching device 8 contains an operational amplifier 8a having a feedback resistor 8c connected between its output and inverting input terminals. Difference voltage $\Delta V_1$ is applied via a resistor 8d to the inverting input of operational amplifier 8a, and via a resistor 8e to the noninverting input of operational amplifier 8a. Switching transistor 8b is arranged between the noninverting input of operational amplifier 8a and the reference potential of the circuit arrangement. The output of operational amplifier 8a is coupled to a second input of adder 9.

Resistances 8c to 8e are designed so that the difference voltage $\Delta V_1$ is present at the output of operational amplifier 8a, as long as transistor 8b is not conductive. In this embodiment, transistor 8b is not conductive as long as uncorrected control voltage $V'_{St}$ is positive. If uncorrected control voltage $V'_{St}$ is positive, the positive difference voltage $\Delta V_1$ is added, which leads to the compensation of the dead zone for positive control voltages, as discussed above. If uncorrected control voltage $V'_{St}$ becomes negative, switching transistor 8b is switched into a conductive state via operational amplifier 7. In this manner, the noninverting input of operational amplifier 8a is short circuited and therefore, only the inverting input is still effective. The values of resistors 8d and 8c are selected such that there is present at the output of operational amplifier 8a the inverted value of the difference voltage $\Delta V_1$ which is equal to the negative difference voltage $\Delta V_2$. Thus, the dead zone is compensated for negative values of uncorrected control voltage $V'_{St}$. With the additional circuitry just described, the circuit is free of a dead zone while the pause durations between the conductive phases of the semiconductor switches of a bridge branch remain uninfluenced.

Although the invention has been described in terms of specific embodiments and applications, persons skilled in the art, in light of this teaching, can generate additional embodiments without departing from the spirit or exceeding the scope of the claimed invention. Accordingly, it is to be understood that the drawings and descriptions in this disclosure are proffered to facilitate comprehension of the invention and should not be construed to limit the scope thereof.

What is claimed is:

1. A method of generating drive pulses for a DC control element of the type having four semiconductor switches arranged in a bridge circuit, the method being of the type having the step of producing drive pulses by comparing a triangular voltage waveform with a control voltage, there being a pause between conductive states of the semiconductor switches within a bridge branch of the bridge circuit, the method comprising the further steps of:
   forming first and second triangular voltage waveforms which are shifted with respect to one another by a difference voltage;
   driving a first semiconductor switch of a predetermined bridge branch in response to a comparison between said first triangular voltage waveform and the control voltage; and
   driving a second semiconductor switch of said bridge branch in response to a comparison of said second triangular voltage waveform with the control voltage.

2. The method of claim 1 wherein there is provided the further step of shifting said first and second triangular voltage waveforms with respect to an auxiliary triangular voltage waveform which is symmetrical with respect to a reference potential, said shifting being achieved by applying respective difference voltages to said first and second triangular voltage waveforms, said difference voltages being equal in magnitude but of opposite polarities.

3. The method of claim 2 wherein there are provided the further steps of:
   adding said positive difference voltage to an uncorrected control voltage when said uncorrected control voltage is positive; and
   adding said negative difference voltage to said uncorrected control voltage when said uncorrected control voltage is negative.

4. The method of claim 1 wherein said difference voltage is proportional to the frequency of the drive pulses.

5. A circuit arrangement for generating drive pulses for a DC control element of the type having four semiconductor switches arranged in a bridge circuit, each semiconductor switch being driven by a respective comparator having first and second inputs, said first input of each comparator receiving a control voltage, the circuit arrangement further comprising a first plurality of first adders associated with a first bridge half and a second plurality of first adders associated with a second bridge half, each of said first adders having a first input for receiving an auxiliary triangular voltage waveform, and a second input, said second input of said first plurality of first adders receiving a positive difference voltage, and said second input of said second plurality of first adders receiving a negative difference voltage.

6. The circuit arrangement of claim 5 wherein there is further provided frequency-voltage converter means for receiving said auxiliary triangular voltage waveform and producing at an output thereof said difference voltage.

7. The circuit arrangement of claim 6 further comprising:
   polarity detection means for controlling a double-throw switch and providing at an output thereof a selectable one of either said negative or said positive difference voltage; and
   a second adder having a first input for receiving the control voltage, and a second input coupled to said output of said double-throw switch in response to the polarity of the control voltage, said second adder being connected at an output thereof to said first input of each of said comparators.

* * * * *